Dec. 27, 1927.  1,653,703
R. M. HAMILTON
APPLIANCE FOR WASHING OR CLEANING TABLE FORKS OR FORKED ARTICLES
Filed April 19. 1926

INVENTOR
R. M. HAMILTON,
BY
ATTY.

Patented Dec. 27, 1927.

1,653,703

UNITED STATES PATENT OFFICE.

RONALD MARSDEN HAMILTON, OF MALVERN, ENGLAND.

APPLIANCE FOR WASHING OR CLEANING TABLE FORKS OR FORKED ARTICLES.

Application filed April 19, 1926, Serial No. 103,043, and in Great Britain June 26, 1925.

This invention has reference to table fork or like article washing or cleaning appliances, and has for its object of providing an appliance of this kind by which table forks and like articles can be cleaned or washed on both sides, and between the prongs or recesses, by a simple and easy movement, and rapidly.

The appliance according to this invention consists of a tube, cup, or thimble shaped device, adapted to fit on to a finger or thumb of the hand, or on to a peg or holder, the outer surface of which has ribs or ridges running round it, say, two or more ribs or ridges converging on a centre one.

In one construction, two or more ribs or ridges converge towards a centre one; and they are so spaced and helically arranged, that at one point the spacing between the ridges is that of the prongs of say a large table fork, and the ridges gradually converge until after nearly a complete revolution about the axis of the cylinder, the spacing is that of the prongs of the smallest fork say for which it is contemplated that the device will be used.

Figure 1:
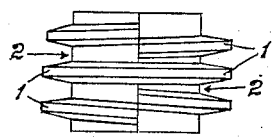
Figure 2:
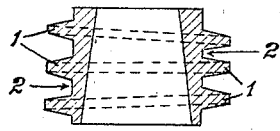

The appliance, the nature of which is above described, is illustrated in the annexed drawings, Figure 1 being an outside view, showing the point where the ends of the ribs or ridges start from and terminate, while Figure 2 is a cross section.

In the case shown the device is in the form of a short tube or cylinder, say of india rubber, and is adapted to fit over a finger or thumb of the hand, or on to a peg or holder.

The ribs or ridges are marked 1, and 2 are the grooves between them; the ribs or ridges being tapered as shown, viz, of a section somewhat similar to that of the tooth of a spur wheel, and of considerable depth.

The distance apart of the ribs or ridges 1 at their opposite ends and intermediate parts varies as seen by the drawings; and except the centre rib, the ribs extend around the appliance in helical form from their opposite ends. Thus the conical groove 2, between the conical surfaces of the ribs or ridges—which act on the tines of the fork—differ in width from one end of same to the other, that is they widen from one—the smaller—end to the other; so that the appliance will act on and be used for cleaning forks having prongs or tines of different spaced widths.

While in the article shown in the drawing there are only three ribs or ridges and two grooves, the appliance may be provided with any suitable number of ribs and grooves.

In use, for cleaning a fork, the device or appliance is placed upon the thumb, finger or peg, and used with a cloth between it and the device in such a position that the ribs or ridges 1 are forced between the prongs of the fork, and then the fork may be tangentially drawn across the device keeping the ridges pressed between the prongs during the whole length of the prongs.

If the appliance is used on the thumb, the hand can be covered with a cloth, and the fork drawn with the other hand through the cloth, gripping it between the device and the fingers, having turned the device round on the thumb, so that the spacing of the ridges will come in contact with the fork.

By this method, in one movement, the fork will be cleaned or washed on each side, and between the prongs, whereas ordinarily it requires a large number of movements to accomplish the same result.

What is claimed is:—

1. An appliance for washing or cleaning table forks or like articles, consisting of a body having upon its surface spaced ribs, one at least of which is of helical form, the spaces or grooves between which diminish in width circumferentially of the body from one end to the other.

2. An appliance for washing or cleaning table forks or like articles, consisting of a body having upon its surface spaced ribs, one at least of which is of helical form, the spaces or grooves between which diminish in width circumferentially of the body from one end to the other; the body being hollow for reception of a finger or thumb of the hand, or a peg or like holder.

In testimony whereof I have signed my name to this specification.

RONALD MARSDEN HAMILTON.